Nov. 15, 1955   R. I. SCHONITZER ET AL   2,723,872
REMOTE CONTROL APPARATUS
Filed March 29, 1950   7 Sheets-Sheet 3

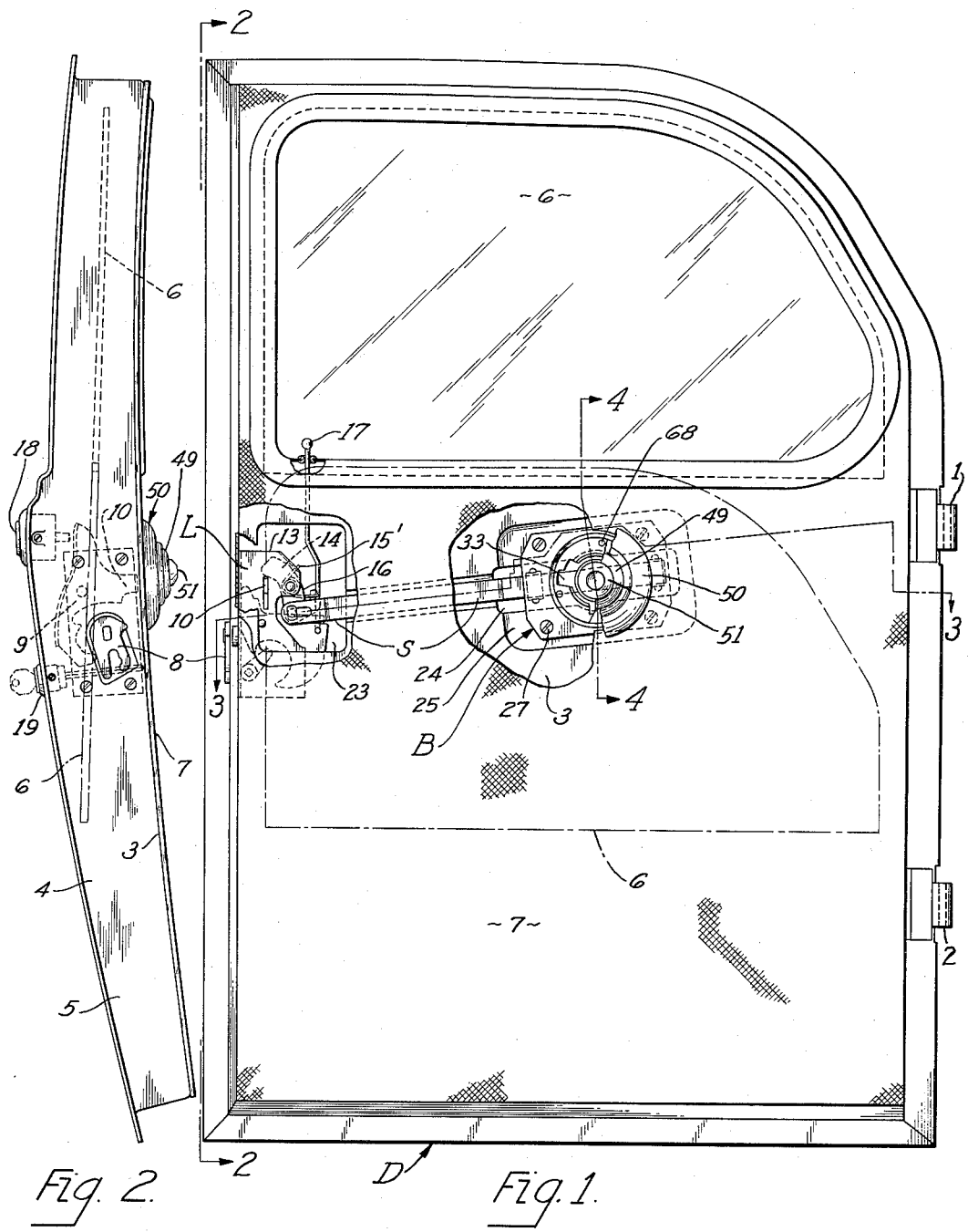

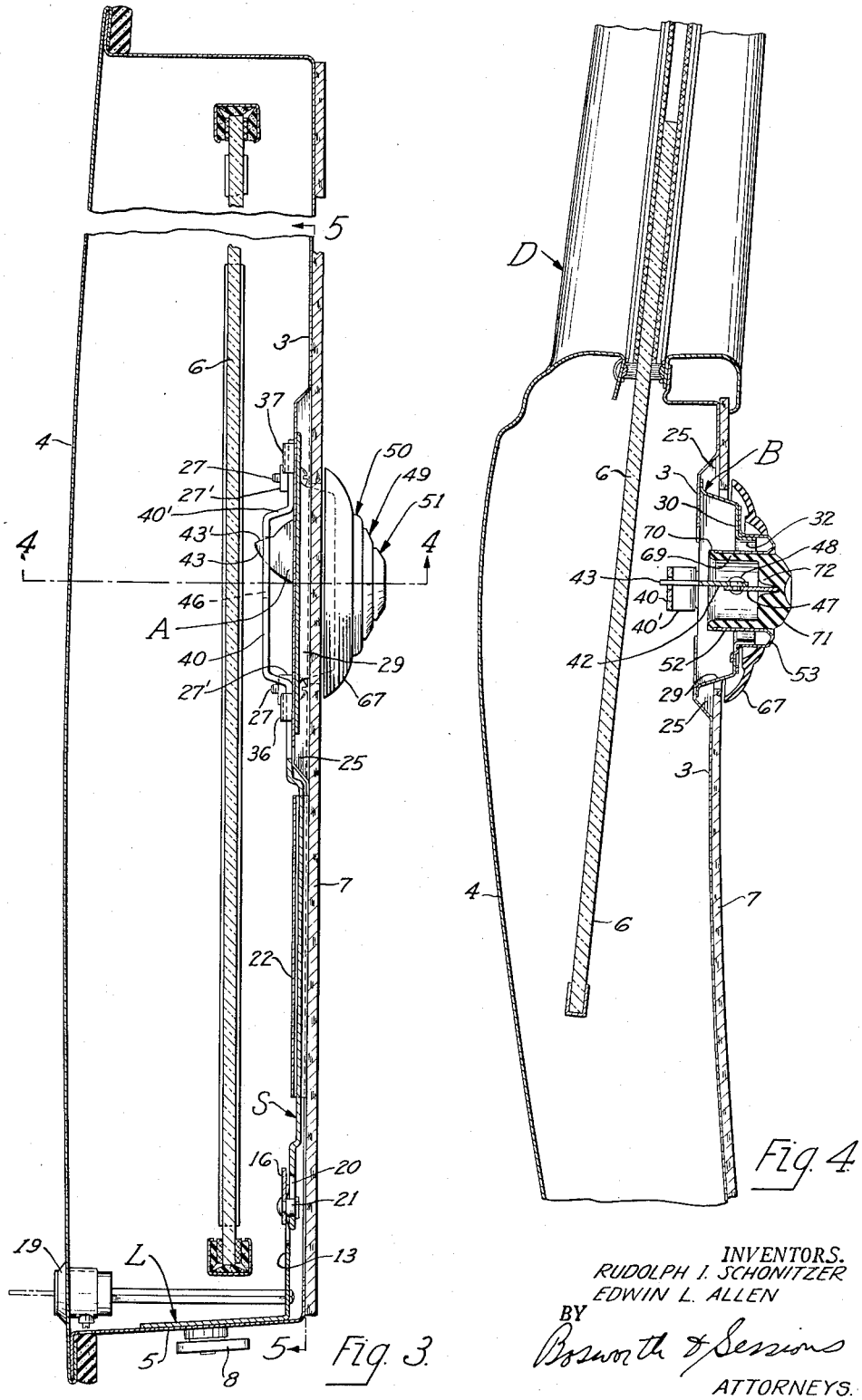

INVENTORS.
RUDOLPH I. SCHONITZER
EDWIN L. ALLEN
BY Bosworth & Sessions
ATTORNEYS.

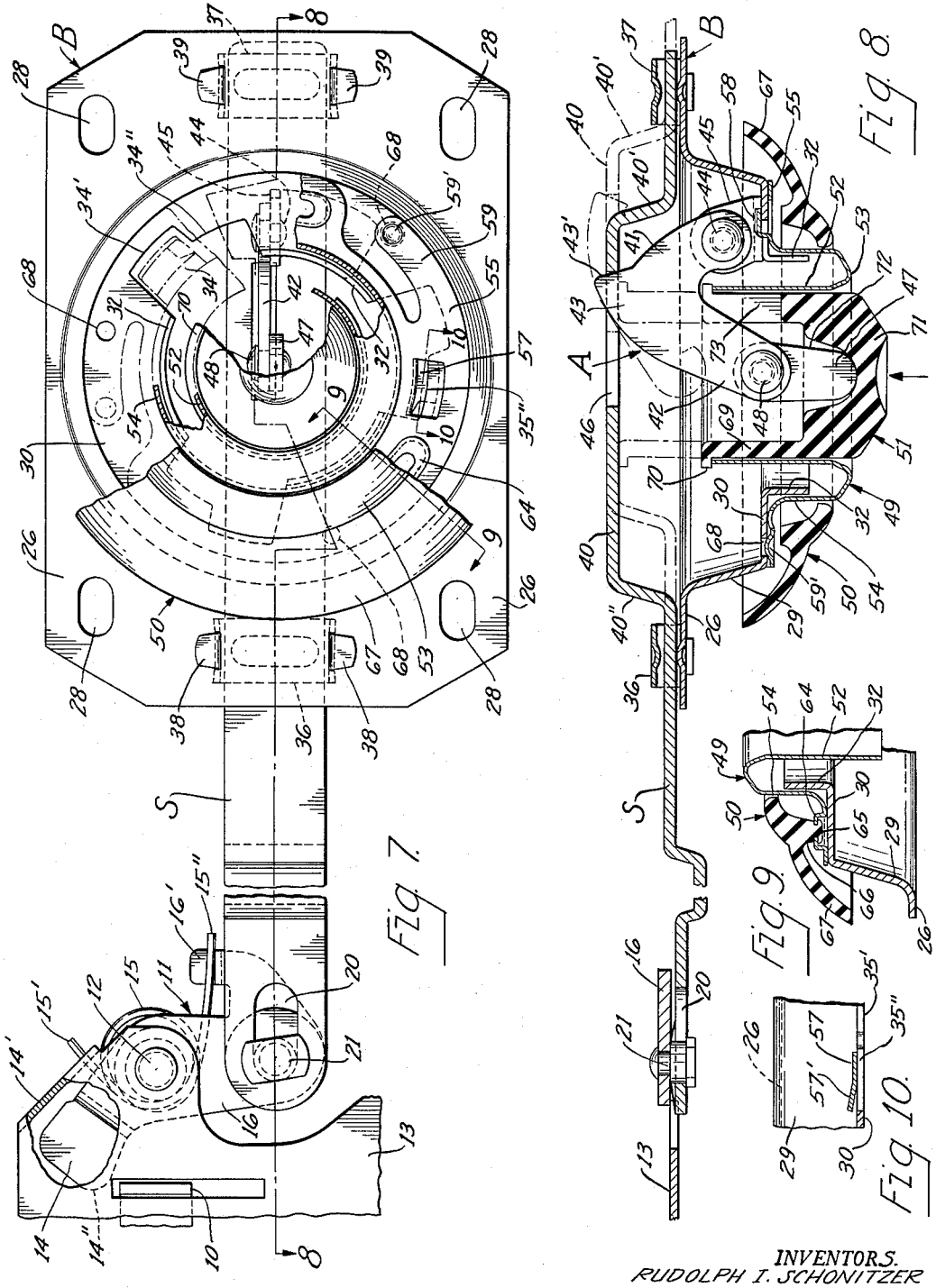

INVENTORS.
RUDOLPH I. SCHONITZER
EDWIN L. ALLEN
BY
ATTORNEYS.

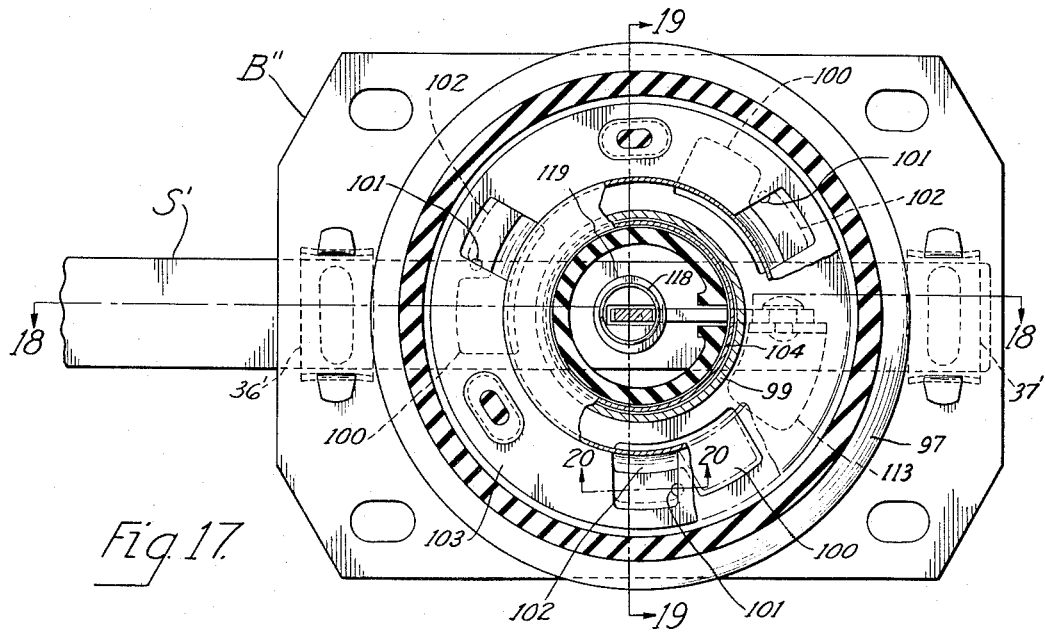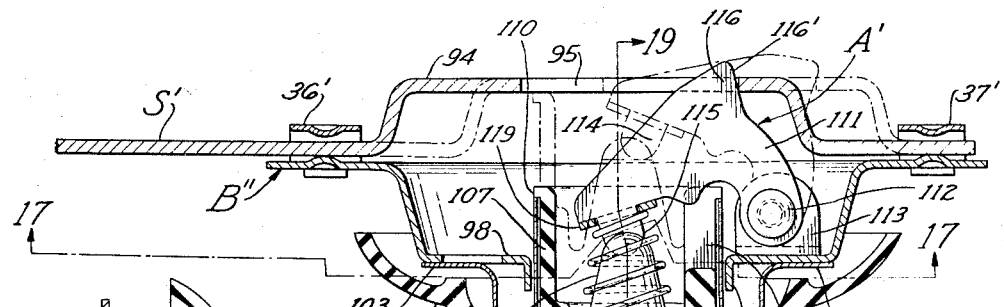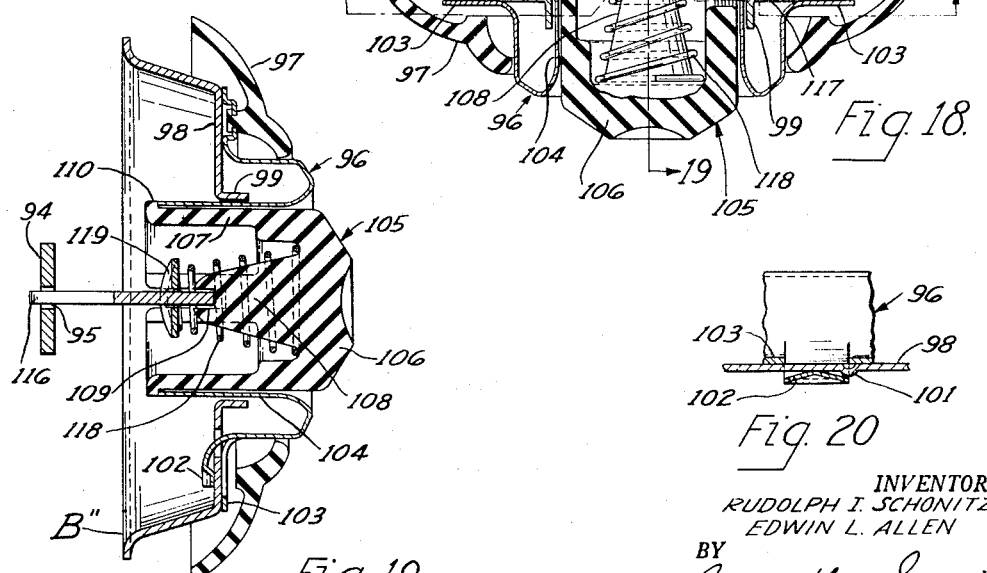

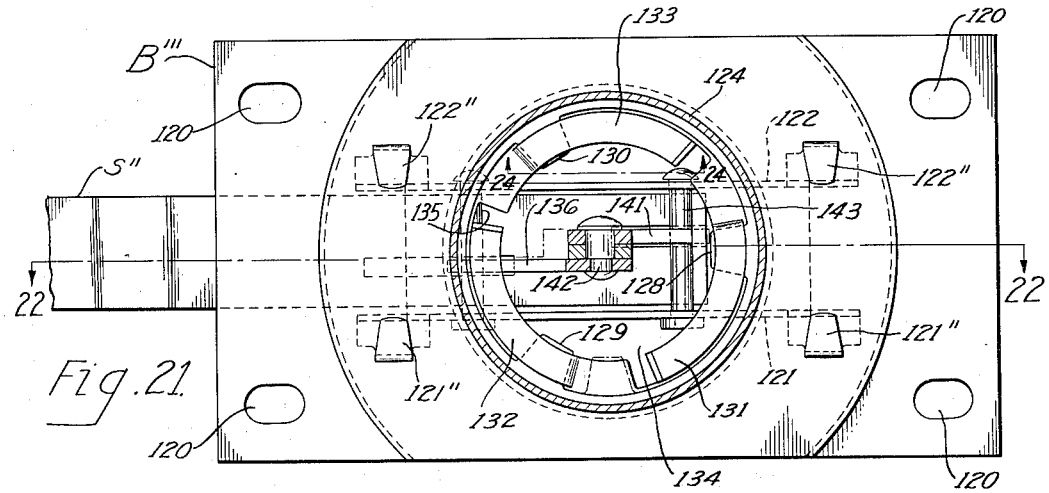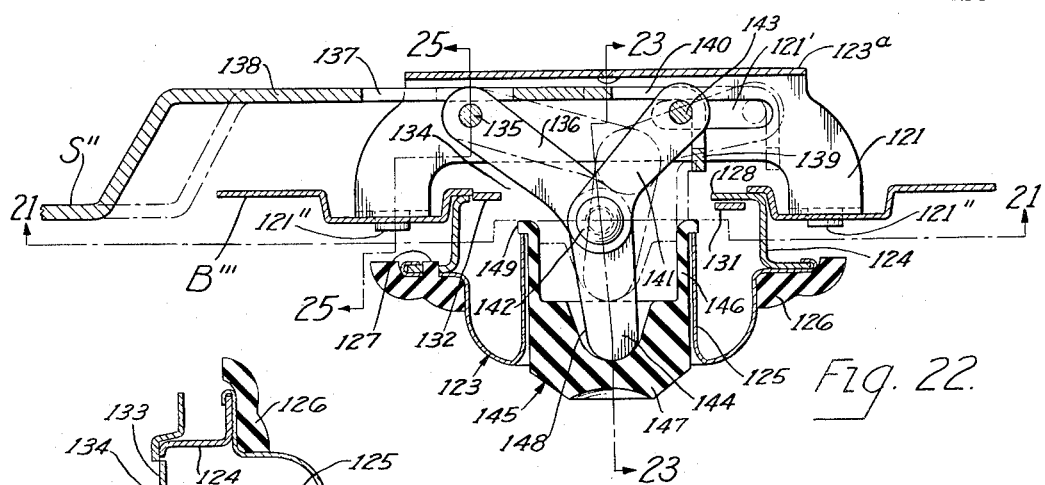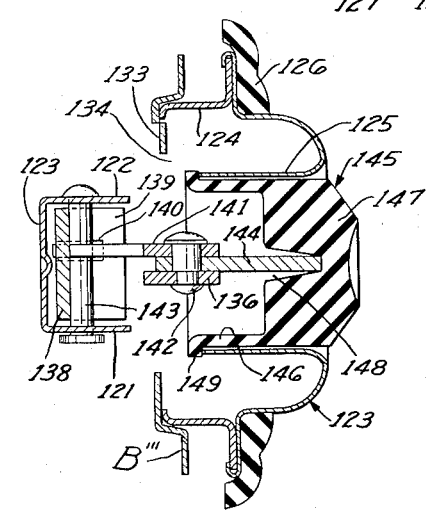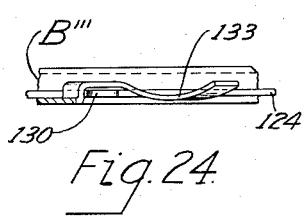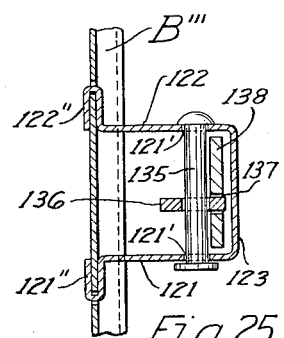

United States Patent Office 2,723,872
Patented Nov. 15, 1955

2,723,872

REMOTE CONTROL APPARATUS

Rudolph I. Schonitzer, Shaker Heights, and Edwin L. Allen, Cleveland Heights, Ohio, assignors, by mesne assignments, to said Schonitzer Application March 29, 1950, Serial No. 152,732

26 Claims. (Cl. 292—216)

This invention relates to door control mechanisms and more particularly to improved remote control apparatus for use on automobile doors or the like.

In modern automobile body construction it is usual practice to mount the door latch mechanism at the free edge of the door. As most automobile doors are presently hinged at their forward edges, it becomes desirable to provide means for releasing the latch mechanism from inside the vehicle which are located on the inner door panel and spaced forwardly from the rear, free edge of the door. Such an arrangement facilitates operation of the front door latch mechanisms from the front seat and permits the rear doors readily to be released from the front seat. This disposition of the latch releasing mechanism is effected by what is commonly known in the industry as "remote control" apparatus.

Certain problems are imposed upon the design of this type of apparatus due to the limited space between the inner door panel and the path of movement of the window glass, the importance of preventing or reducing the possibility of accidental release of the door, and the desirability of maintaining the projection of the remote control apparatus beyond the inner face of the door to a minimum. Accordingly, it is an object of our present invention to provide a remote control apparatus which is readily adaptable to use with different types of door latch mechanisms, which may be economically manufactured, which may be easily installed by unskilled labor, and which substantially eliminates the possibility of accidental release of the latch mechanism from inside the vehicle.

Other objects of our invention include: the provision of remote control mechanism for automobile doors which may be actuated by a push button and which has a minimum over-all width transversely of the plane of the door so that interference with the window glass and excessive projection into the body space are avoided; the provision of a remote control mechanism of compact form which may be operated by relatively low manual pressure exerted upon a push button; the provision in a remote control mechanism of means automatically effective during installation to provide the desired spring loading on the mechanism, thus rendering it rattle-free in use; the provision of a remote control mechanism which may be installed on either a right-hand door or a left-hand door without change, thus eliminating the necessity for making the mechanisms in rights and lefts; and the provision of a remote control mechanism which is readily susceptible to attractive external design and which permits variation of certain decorative features without changing the basic mechanism.

The above and other objects of our invention will appear from the following description of several embodiments thereof, reference being had to the accompanying drawings in which:

Figure 1 is a side elevational view of the inside of what may be considered the left-hand front door of an automobile, parts of the interior trim and of the remote control mechanism being broken away for better illustration, the latch mechanism being seen in door latched position and our remote control apparatus in its non-operating or idle position.

Figure 2 is a view taken substantially on line 2—2 of Figure 1, looking at the free edge wall of the door.

Figure 3 is an enlarged horizontal cross-sectional view taken substantially on line 3—3 of Figure 1.

Figure 4 is an enlarged fragmentary vertical cross-sectional view taken substantially on line 4—4 of Figure 1.

Figure 7 is an illustrative side elevational view of the remote control apparatus of Figures 1-6 in its idle or non-operating position, the door panel being omitted and parts of the push button, push button guide and bezel being broken away for better illustration of the detachable means for mounting the push button unit on the main bracket.

Figure 8 is a horizontal cross-sectional view taken substantially on line 8—8 of Figure 7.

Figure 9 is an oblique fragmentary cross-sectional view taken substantially on line 9—9 of Figure 7.

Figure 10 is a generally horizontal fragmentary cross-sectional view taken substantially on line 10—10 of Figure 7.

Figure 17 is a detached side elevational view of a modified form of our improved remote control apparatus, the connection to the latch mechanism being omitted and portions being illustrated in cross-section as indicated by section line 17—17 of Figure 18.

Figure 18 is a horizontal cross-sectional view of the mechanism shown in Figure 17, taken substantially on line 18—18 of Figure 17.

Figure 19 is a vertical cross-sectional view taken substantially on line 19—19 of Figures 17 and 18.

Figure 20 is a fragmentary cross-sectional view taken substantially on line 20—20 of Figure 17.

Figure 21 is a view generally similar to Figure 17 but illustrating another modified form of our remote control apparatus, certain parts being shown in cross-section as indicated by section line 21—21 of Figure 22.

Figure 22 is a horizontal cross-sectional view taken substantially on line 22—22 of Figure 21.

Figure 23 is a vertical cross-sectional view taken substantially on line 23—23 of Figure 22.

Figure 24 is a fragmentary cross-sectional view taken substantially on line 24—24 of Figure 21.

Figure 25 is a vertical cross-sectional view taken substantially on line 25—25 of Figure 22.

Figure 5:
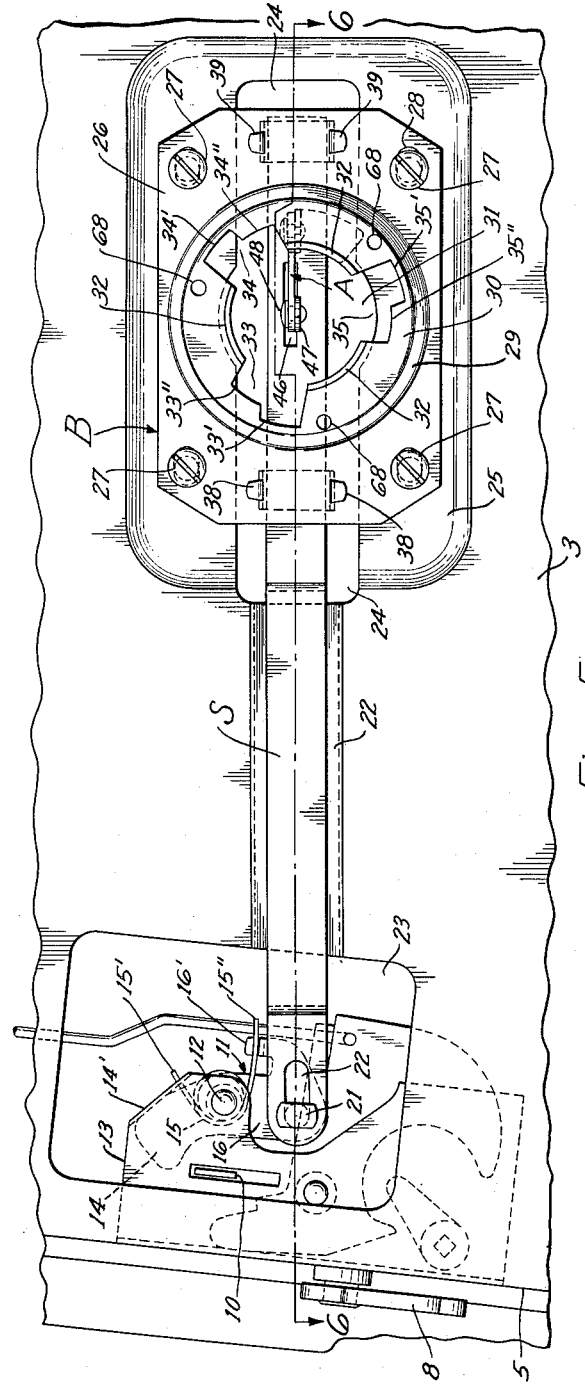
Figure 5 is a fragmentary side elevational view taken substantially on line 5—5 of Figure 3, the push button, push button guide and bezel being removed and the link and main bracket being set in proper installed position whereby automatic spring loading of all parts is secured upon installation of the push button unit.

In Figure 1 a left-hand front automobile door is indicated generally at D. The hinges 1 and 2 are located on the forward edge of the door and provide hinged support for the door on its frame structure (not shown) in well-known manner. In order releasably to maintain the door in closed position a suitable latch mechanism L is employed. Although it will be understood that our improved remote control apparatus may be used with many different types of latch mechanisms, we have illustrated it herein in association with a latch mechanism of the general type disclosed and claimed in the copending United States patent application of Edwin L. Allen, Serial No. 131,296 filed December 6, 1949, now Patent No. 2,665,159 dated January 5, 1954. Certain elements of the latch mechanism L illustrated herein are also described and claimed in the copending Edwin L. Allen United States patent application Serial No. 76,023 filed February 12, 1949, now Patent No. 2,665,156 dated January 5, 1954, and reference is accordingly made to these applications of one of the co-inventors herein.

The door D includes an inner panel 3, an outer panel 4 and a free edge wall 5. The window glass 6 is supported in the usual manner for lifting and lowering, being seen in Figures 1 and 2 in its raised position with its lowered position indicated in phantom lines. The usual fabric covered interior trim panel 7 is mounted on the outer face of inner door panel 3 and in Figure 1 has been broken away around the latch mechanism and part of the remote control apparatus so that they may be better exposed to view.

The latch mechanism L includes a bifurcated latch member 8 supported on the outside of free edge wall 5 for movement transversely of the general plane of the door D between latched and unlatched positions and a suitable keeper (not shown) is supported on the adjacent portion of the door frame. A detent member 9 having a transversely extending operating arm 10 is adapted releasably to retain the latch member 8 in door latched position. The latch mechanism is so arranged that downward movement of the detent arm 10 from its door latched position seen in Figures 1 and 2 effects release of the latch member 8 from latched position permitting opening of the door.

Figure 6:
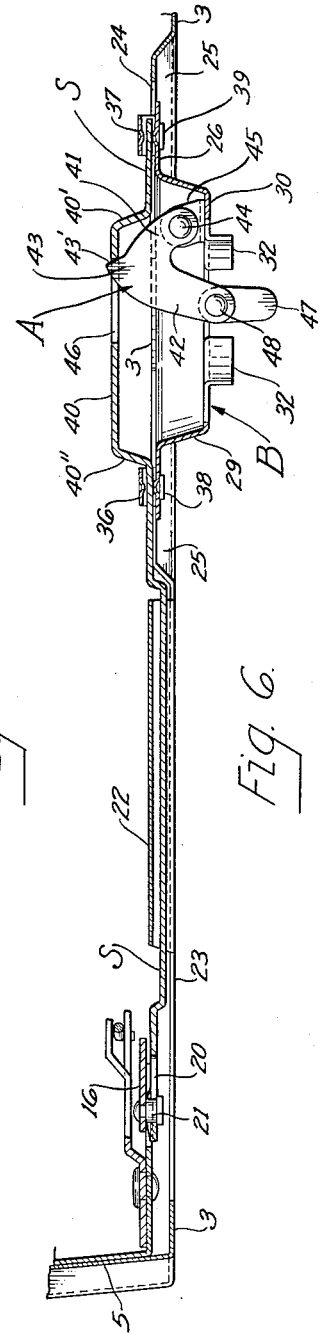
Figure 6 is a horizontal cross-sectional view taken substantially on line 6—6 of Figure 5.
Figure 11:
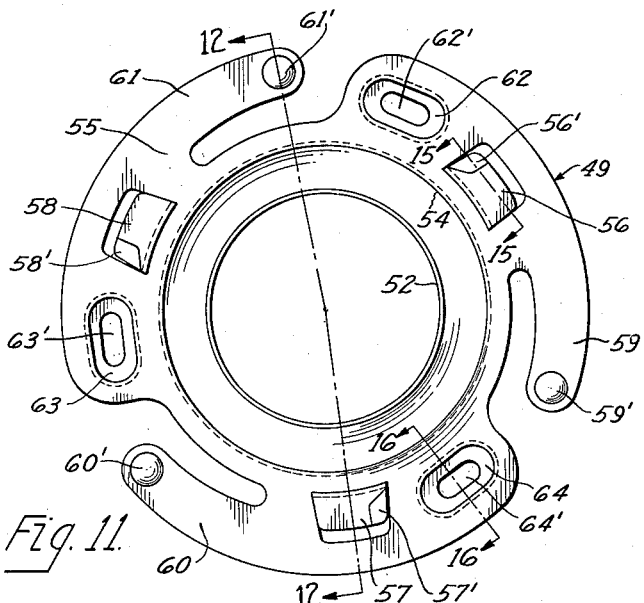
Figure 11 is a detached view of the push button support and guide member illustrated in Figures 1-10, looking at the inner face of its flange portion.
Figure 12:
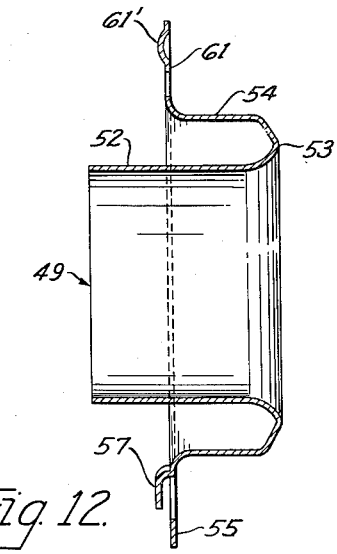
Figure 12 is a cross-sectional view taken substantially on line 12—12 of Figure 11.

As best seen in Figures 5 and 6, a lever 11 is pivotally mounted on a pin 12 on the side flange portion 13 of the latch housing. The upper end portion 14 of lever 11 is so disposed that when moved in counterclockwise direction from its idle or non-operating position of Figure 1 it engages the detent arm 10 and moves it downwardly, thus releasing the detent and unlatching the door. In order to urge lever 11 at all times toward its idle position of Figure 1 a spring 15 encircles pivot pin 12 and has one end 15' anchored to the side flange 13 and its other end 15" in engagement with a lug 16' on the lower arm portion 16 of lever 11.

Although various other parts of the latch mechanism are illustrated in the drawings it need only be mentioned here that the usual garnish molding lock operating knob 17 is adapted to lock the mechanism against undesired opening of the door. Furthermore, suitable means such as a push button 18 are provided for actuation of the door latch mechanism from outside and a key controlled lock 19 permits locking and unlocking the door from outside.

As illustrated in Figures 1 to 12, our improved remote control apparatus includes a link member S, illustrated as a flat strap but which might be a rod or of other suitable form. The link S is slotted at its outer (left-hand in Figures 1 and 5) end at 20 to accommodate the T-headed pin 21 on the lower end 16 of latch operating lever 11. During installation the link S is held in a generally vertical position on the outside of the inner door panel 3 (i. e., toward the interior of the vehicle body from the inner door panel) and the slot 20 slipped over the T head of pin 21. Link S is then rotated in clockwise direction (as seen in Figures 1 and 5) to its assembled operating position with its mid portion lying in an elongated inwardly extending channel 22 formed in door panel 3. Channel 22 extends from the opening 23 adjacent the latch mechanism L to the elongated aperture 24 which, as illustrated, is disposed substantially midway between the hinge edge of the door and the free edge wall 5 thereof. The metal of the inner door panel 3 is preferably depressed in an area 25 around the aperture 24 to permit the remote control apparatus to be located properly and to provide a surface permitting installation of the inner trim panel 7 without undesirable projections thereon.

The main bracket or base for the remote control apparatus is generally indicated at B and includes a base plate portion 26 adapted to be mounted on the inner door panel 3 within the recessed portion 25 by suitable screws 27 which engage properly located clinch nuts 27' or the like (see Figure 3) on the inner face of panel 3. As best seen in Figure 5, elongated holes 28 are formed in plate portion 26 to accommodate the screws 27 and permit a limited degree of positioning adjustment of the bracket B for purposes which will be later explained. From the above description it will be seen that the remote control apparatus may be installed on the door from the exposed or outer side of inner panel 3 thus making it possible to mount the remote control apparatus after the door structure is otherwise substantially completed except for the addition of the trim panel 7.

Projecting outwardly away from the plate portion 26 of bracket B is a flange 29 supporting the offset portion 30 which is provided with a central aperture 31. This aperture 31 is substantially aligned with the aperture 24 in inner door panel 3 when the parts are assembled as seen in Figures 1 and 5 and is partially defined by segmental outwardly projecting guide flanges 32. Identical radially extending cut out portions 33, 34 and 35 are spaced around the central aperture 31 and have, as clearly seen in Figure 5, deep portions 33', 34' and 35' and shallow portions 33", 34" and 35" respectively.

Link guide loops 36 and 37 have end tangs 38 and 39 respectively which extend through slots in base portion 26 of bracket B and are bent outwardly as seen in Figure 5 to retain the guide loops in position. The inner end portion of link S extends through guide loops 36 and 37 which provide a support permitting longitudinal movement thereof. It will be noted from Figures 6 and 8 that inwardly extending projections are formed on the base portion 26 and on the guide loops 36 and 37 to reduce to a minimum frictional engagement between the link S and the bracket B. Between guide loops 36 and 37 link S is offset inwardly to provide an offset portion 40 extending inwardly from the adjacent portion of inner panel 3 in the opposite direction from the offset portion 30 of bracket B.

It will be observed by reference to Figures 1–7 that longitudinal movement of strap or link S forwardly of the door (to the right in the drawings) from its illustrated idle or non-operating position will result in counterclockwise latch releasing movement of lever 11 causing its upper end portion 14 to engage the transverse arm 10 of detent 9 and move the detent into latch released position. Upon release of the force which has been applied to move the link S to the right, the spring 15, acting through the lever 11, will return the link S to its idle position seen in Figures 1 and 7.

The link actuating means which effects this latch releasing movement of link S includes a link actuating member A which, as illustrated in Figures 1–8, is a generally U-shaped element having spaced arm portions 41 and 42 connected by a base portion 43. Arm portion 41 may conveniently be termed the support portion of the link actuating member and is pivotally mounted on a pin 44 carried by an inwardly extending flange 45 on the inner face of offset portion 30 of bracket B. Furthermore, arm portion 42 of link actuating member A may conveniently be termed the operating portion as the force for unlatching the door is applied through this arm. The base portion 43 may conveniently be termed the contact portion of the link actuating member A as it includes a face 43' which extends through an elongated slot 46 in the offset portion 40 of the link S and is adapted operatively to engage one end thereof. In the embodiment being described the link actuating member A also includes, as a part of the operating arm portion thereof, a connecting arm 47 pivotally attached at 48 to the free end of arm portion 42.

Before describing the manually operable means which we provide for operating our remote control apparatus, the operation of the link actuating member A will be explained. As previously noted, the parts are seen in their completely assembled idle or non-operating positions in Figures 1, 7 and 8. If pressure is now exerted inwardly against the operating portion 42 the link actuating member A will swing about its pivotal support 44. As operating portion 42 moves inwardly in a direction transverse to the general plane of the inner door panel 3 the contact portion 43, and its face 43', will move in a direction more or less parallel to the general plane of the inner door panel 3. As the face 43' is in engagement with the offset portion 40 of link S longitudinal sliding movement will be imparted to the link S and it will be moved from its idle or non-operating position seen in full lines in Figure 8 into its latch releasing position seen in phantom lines in Figure 8.

Engagement of the end portion 40' of offset portion 40 of link S with the guide loop 37, as seen in phantom lines in Figure 8, limits movement of link S in latch releasing direction when the push button is not installed and it will be seen that link S, bracket B and actuating member A are held together as a sub-assembly prior to and during installation on the door. When actuating pressure is withdrawn from the link actuating member A the spring 15 will return the link S and the link actuating member A to their idle positions.

As illustrated, the manually operable means for moving the link actuating member A includes what may be termed a push button unit detachably mounted on the main bracket B. This push button unit comprises a push button support and guide member generally indicated at 49, a bezel, generally indicated at 50, secured to the push button support 49, and a push button generally indicated at 51. The push button support and guide member 49 is illustrated in detached views in Figures 11 and 12 and comprises an open ended tubular push button guide sleeve 52, having its outer end flared outwardly at 53, an oppositely extending locating sleeve 54, and a mounting flange 55 projecting radially outwardly from the inner end of sleeve 54. Projecting inwardly from the flange 55 are three circumferentially spaced attaching tangs 56, 57 and 58. These tangs have bent portions 56', 57' and 58', resspectively, at their leading edges to facilitate assembly as will later appear and are detached from the flange 55 on their outer three sides. Circumferentially extending spring retainer arms 59, 60 and 61 are formed in the mounting flange 55 adjacent the rear or trailing ends of tangs 56, 57 and 58 respectively. These retainer arms are provided with inwardly projecting bosses 59', 60' and 61' at their respective free ends. Adjacent the forward or entering end portions 56', 57' and 58' of the attaching tangs on the flange 55 are outwardly projecting bosses 62, 63 and 64 having elongated center holes 62', 63' and 64' which, as will appear later, serve to secure the bezel 50 to the push button support 49.

As is clearly seen in Figures 7, 8 and 9, bezel 50 is circular in form with an attractively contoured sloping outer surface and has a central aperture adapted to fit snugly around the locating sleeve 54 of push button support 49. Projections 65 (see Figure 9) are circumferentially spaced on the inner flange 66 of bezel 50 to correspond to the locations of bosses 62, 63 and 64 on the flange 55 of the push button support 49. In assembling the bezel, which is preferably moulded of suitable plastic material, on the support member 49 the projections 65 are inserted through the holes 62', 63' and 64' and are then headed over, as by heating, to secure the bezel firmly in position on the push button support 49. The outer skirt portion 67 of the bezel 50 extends inwardly beyond the flange 55 of the push button support member 49 and when installed on a door is adapted substantially to engage the outer surface of the inner trim panel 7 as is clearly seen in Figures 2 and 3.

To install the push button support and guide member 49, together with bezel 50 mounted thereon, in position on the offset portion 30 of bracket B it is only necessary to slip the locating sleeve 54 over the guide flanges 32 on bracket B with the tangs 56, 57 and 58 respectively aligned with the deep portions 33', 34' and 35' of the radially extending cut-outs in offset portion 30 of bracket B. Slight inward pressure on the bezel will cause the spring retainer arms 59, 60 and 61 to yield until the inner face of mounting flange 55 of the push button support 49 engages the outer face of offset portion 30 of bracket B. When this engagement takes place the bezel and push button support are rotated in a clockwise direction as seen in Figure 7, causing the inwardly bent forward edges 56', 57' and 58' of tangs 56, 57 and 58 to override the adjacent portions of the offset portion 30 of bracket B. Further rotation of the push button support 49 in clockwise direction will cause these tangs to reach their full locked positions seen in full lines in Figure 7. These locked positions are determined by spaced holes 68 in flange 30 into which the bosses 59', 60' and 61' simultaneously drop under the influence of their respective spring arms 59, 60 and 61 when the bosses and the holes are in alignment. The push button 51 is, of course, normally positioned in sleeve 52 during the above described assembly operation.

The preliminary position of the push button support 49 relative to the bracket B preparatory to locking assembly thereof is shown in phantom lines in Figure 7 and the final assembled and locked position is shown in full lines. The spring pressed engagement of rounded bosses 59', 60' and 61' in the locking holes 68 resists rotation of the push button support 49 and holds it in position during use. However, due to the rounded formation of the bosses, the push button support can readily be removed without tools by exerting sufficient force on bezel 50 in counterclockwise direction to cause the bosses 59', 60' and 61' to be cammed out of their locking holes 68 after which rotation into the phantom line released position of Figure 7 is relatively free from resistance.

It is to be understood that frictional engagement between the tangs 56, 57 and 58 and the offset portion 30 of bracket B is not intended nor desired and that retention of the parts against relative rotation is obtained by the spring pressed boss and locking hole arrangement described above. The tangs 56, 57 and 58 of course effectively hold the push button bracket 49 and bezel 50 against axial movement relative to the bracket B.

With the above described improved automatic locking bayonet type joint construction assembly of the push button support and bezel, and the push button, can conveniently and rapidly be accomplished after the other parts of the remote control mechanism are installed on the door and after the inner trim panel 7 is in place. No tools or special skill are required either for assembly or removal of the push button unit. The bezel 50 and push button 51 are preferably made of plastic in attractive colors which can be varied or changed as desired either during or after finishing of the vehicle body.

Referring particularly to Figures 4 and 8, the push button 51 includes a tubular open ended inner guide skirt portion 69 having an outwardly extending retaining flange 70 at its inner open end and a closed outer end portion 71 preferably having an external form as indicated in Figure 8 to facilitate manual pressure thereagainst. A slot 72 extends from within the skirt 69 into the closed end portion 71 of push button 51. This slot is rounded at its inner end as seen in Figure 8 to conform to the rounded end of connecting arm 47 of the link actuating member A. As seen in Figure 4, slot 72 is relatively narrow to offer lateral support and guidance to arm 47. The wall of tubular skirt portion 69 is slotted inwardly from its open end at 73 (see Figure 8) and when the parts are assembled the operating portion 42 of link actuating member A lies partially within this slot. Thus relative rotation between the push button 51 and the link actuating member A is prevented and inward latch releasing movement of push button 51 from its idle non-operating position of Figure 8 into its maximum latch releasing position shown in phantom lines in Figure 8 is permitted. In assembly of the parts the push button 51 is inserted in guide sleeve 52 and, as the support member 49 is brought into engagement with offset 30, the slot 72 is aligned to receive arm 47. This results in automatic alignment of slot 73 with arm 42 of actuating member A so that support member 49 may be properly seated. Locking rotation of support 49 does not rotate push button 51 because of its engagement with arms 47 and 42.

During inward latch releasing movement of push button 51, caused by manual pressure on the closed end 71 thereof, the push button is guided by the guide sleeve 52 and the slot 73 provides clearance for the link actuating member A. Inward movement of the push button is transmitted through arms 47 and 42 causing the member A to swing about its pivotal support 44 and the contact portion 43 thereof to move in an arcuate path in a direction generally parallel to the plane of the inner panel of the door on which the assembly is mounted. Such movement of contact portion 43 of course causes corresponding longitudinal movement of link S with consequent unlatching of the latch mechanism as has been previously explained.

Upon release of operating pressure against the push button 51, the spring 15 returns all of the parts to their idle or non-operating positions of Figure 8 with the push button flange 70 abutting the inner end of guide sleeve 52, thus limiting the movement of all of the parts of the remote control apparatus and also of the lever 11. It will be noted from Figure 8 that when in non-operating position end portion 40" of offset 40 of link S is spaced from guide loop 36 thus insuring that push button flange 70 alone determines the idle or non-operating positions of the parts and that all operating contacts, pivots, etc., will be spring held in engagement to prevent slack and rattles in the assembly. Furthermore, when assembled on a door as seen in Figure 7, flange 70 on push button 51 engages the end of sleeve 52 before the upper end 14 of lever 11 has engaged the flange 14' on the latch housing and thus flange 70 also limits movement of lever 11 and determines its idle or non-operating position.

It has been previously mentioned that, when assembling our remote control apparatus on a door, the bracket B may be adjusted to a limited degree before the screws 27 are tightened to secure it firmly to the inner door panel 3. In making this adjustment the installer moves the bracket B to the right (Figure 5) until the end of slot 20 in link S engages the pin 21 and he first feels the resistance to latch releasing movement of lever 11 which is constantly imposed thereon by spring 15. When this resistance is felt the link S will be in its farthest left position (Figure 6) with end portion 40" of offset 40 engaging the guide loop 36. The screws 27 are now tightened and the parts then are in the positions illustrated in Figures 5 and 6 with the upper end 14 of lever 11 substantially in engagement with the flange portion 14' of the latch housing and with the arm portions 42 and 47 of actuating member A projecting slightly farther from the bracket B than they do in their non-operating positions (Figure 8) after installation of the push button unit. After the inner trim panel 7 is installed the push button unit is assembled to the bracket B as described above.

During this assembly the push button 51 is aligned with the latch actuating unit A so that the slot 73 overlies the arm portion 42. The length of arms 42 and 47, the distance between the bottom of slot 72 and the flange 70 on push button 51, and the other dimensional relationships are such that a small degree of inward movement is imparted to the operating portion 42 of link actuating member A by push button 51 when push button support 49 is seated and locked to the bracket B. This movement of link actuating member A is in latch releasing direction but is sufficient only to move the link S to the right enough to turn lever 11 on its pivotal support from the position seen in Figure 5 into that seen in Figure 7. However, this movement assures spring loading of all the parts and all of the pivotal mounting and other contact points therebetween, thus automatically providing an installation which is free from slack, lost motion, and rattles. Furthermore, this arrangement insures that the advance upper edge portion 14" (Figure 7) of lever 11 will be located substantially the same distance from the detent arm 10 when the parts are in their idle positions in all installations, thus insuring that substantially the same inward movement of push button 51 will be required to effect release of the latch mechanism in each installation. The point of engagement of arm 47 with the push button 51 is at the bottom of slot 72. As this point is disposed outside of the transverse center line of the cylindrical engaging surfaces of guide sleeve 52 and push button 51 there will be no tendency for the button to tilt and jam in sleeve 52 during outward movement.

The described apparatus is so designed that the latch mechanism will not be released until the outer face of the end 71 of push button 51 is completely within the guide sleeve 52. Thus, even though accidental pressure against the push button may urge it inwardly, the latch will not be released and the door cannot be opened unless the operator's thumb actually pushes the button well into the sleeve 52. The amount of depression of push button 51 required for latch release may of course be varied as desired by suitable modification of the proportions of the parts. By our improved linkage the thumb pressure applied against push button 51 is most advantageously utilized to give the necessary latch releasing movement to the remote control link S with the desired push button travel. This improved result is obtained with an apparatus having a very small overall width (the distance from offset 40 on link S to the outer end of push button 51) and this width is divided so that part of the apparatus lies inside and part outside of the inner door panel. By this arrangement room is provided for movement of the glass within the door while excessive projection of the manual operating means into the vehicle body is avoided.

The remote control mechanism described above and illustrated in Figures 1–12 possesses the distinct advantage that it may be installed on either the right-hand door or the left-hand door of a vehicle without any change whatsoever. This is made possible by the symmetrical arrangement of the link S, the bracket B, and the mounting holes 28 about the longitudinal center line of the link S and eliminates the necessity, common to all prior remote control mechanisms with which we are familiar, for making right and left hand units for the opposite doors of a vehicle body. It will be understood that this results in substantial savings in tooling and other manufacturing and assembly costs, greatly facilitates installation of the mechanisms, and renders it unnecessary for the manufacturer to keep a balanced stock of right and left hand units as was previously the case. This same desirable feature is present in the other embodiments of our invention illustrated and described herein.

Figure 13:
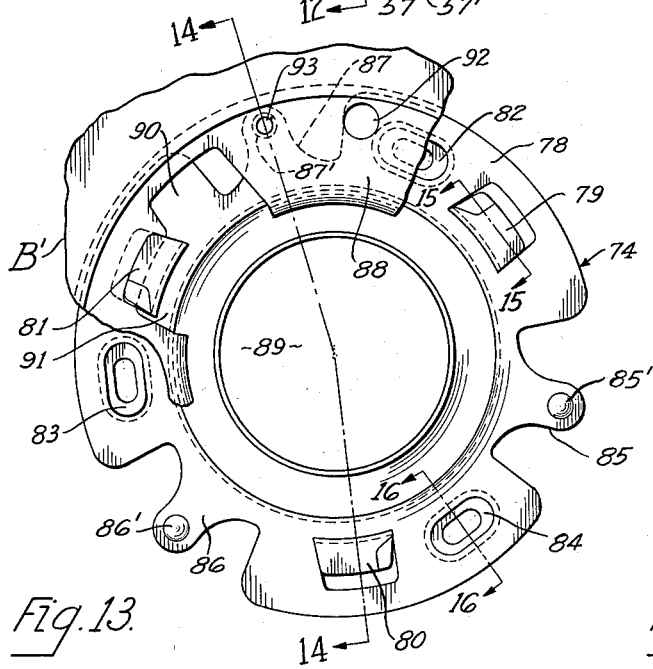
Figure 13 is a view generally similar to Figure 11 but illustrating a modified form of push button guide and support member, a portion of the main bracket also being included to show the assembled relation of the parts.
Figure 14:
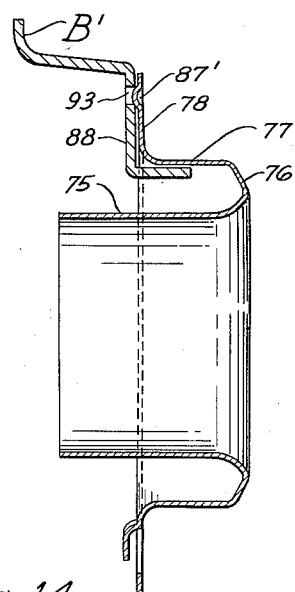
Figure 14 is a cross-sectional view taken substantially on line 14—14 of Figure 13.
Figure 15:
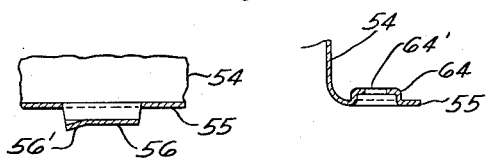
Figure 15 is a fragmentary cross-sectional view taken substantially on line 15—15 of Figure 13.
Figure 16:
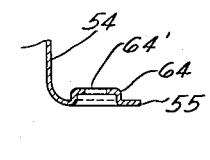
Figure 16 is a fragmentary cross-sectional view taken substantially on line 16—16 of Figure 13.

In Figures 13 and 14 we have illustrated a modified form of push button support and guide member which is generally indicated at 74. Except for the lock or retaining means for the bayonet joint, support member 74 is substantially the same as the previously described push button support member 49 and includes a guide sleeve 75, a closed end portion 76 and a locating sleeve 77. The flange portion 78 extends outwardly from the inner end of locating sleeve 77 and is provided with attaching tangs 79, 80 and 81 which are similar to the previously described attaching tangs 56, 57 and 58. The outwardly projecting bezel mounting bosses 82, 83 and 84 are similar to bosses 62, 63 and 64 and serve the same function. Three radially extending spring lock or retaining arms 85, 86 and 87 project outwardly from the inner portion of flange 78 and carry inwardly projecting bosses 85', 86' and 87' at their respective outer ends.

As seen in Figures 13 and 14, the offset portion 88 of bracket B' on which push button support 74 is mounted has a central aperture 89 and circumferentially spaced deep and shallow cut-out portions which correspond in function and location to the cut-out portions 33'—33", 34'—34", and 35'—35" of bracket B. A pair of these deep and shallow cut-out portions are seen in Figure 13 at 90 and 91 and the push button support member 74 is attached to bracket B' by applying it against the outer face of offset portion 88 with the tangs 79, 80 and 81 in alignment with the deep cut-out portions 90, etc. of bracket B'. The support member 74 is then rotated until these tangs overlie the offset portion 88 adjacent the shallow cut-out portions 91, etc. Spaced from each set of deep and shallow cut-out portions 90—91, etc. of bracket B' are pairs of holes 92 and 93. As will be noted from Figure 13, hole 92 is larger in diameter than the boss 87' and thus permits the inner face of flange 87 on push button support member 74 to have full engagement against the outer face of offset portion 88 of bracket B' without exerting any pressure against the support member 74.

In installing the modified support member 74 on the modified bracket B' the bosses 85', 86' and 87' drop into the holes 92, etc. when the attaching tangs 79, 80 and 81 are aligned with the deep cut-outs 90, etc. Initial rotation of the support member 74 in locking direction (counterclockwise as seen in Figure 13) causes the forward edges of the tangs to engage the offset portion 88. Further rotation of member 74 in locking direction will cause the bosses 85', etc. to be cammed out of holes 92, etc. and ride up onto and over the outer face of offset portion 88 of bracket B'. As the lock arms 85, 86 and 87 are resilient in nature their respective bosses will drop into the relatively small holes 93, etc. in offset portion 88 of bracket B when the push button support member 74 reaches its assembled position seen in Figures 13 and 14.

Thus the push button support 74 will be retained against rotational movement out of its locked position by virtue of the engagement of the spring pressed bosses 85', 86' and 87' in the holes 93, etc. This engagement is clearly seen in Figure 14. Removal of the push button support 74, the bezel carried thereby, and the push button is effected by merely exerting sufficient force in a clockwise direction as seen in Figure 13 to cause the bosses 85', etc. to be cammed out of the retaining holes 93, etc. and then continuing to rotate the member 74 until the tangs 79, 80 and 81 are clear of the offset portion 88 of bracket B and can be removed through the deep cut-outs 90, etc. therein. The arrangement of Figures 13 and 14 avoids the necessity for exerting any inward manual pressure against the push button support member or the bezel during installation as the large holes 92, etc. permit the proper engagement of the parts and sufficient initial rotation thereof to enable the tangs 79, 80 and 81 to slide under the adjacent portions of bracket B'. Thus spring arms 85, 86 and 87 can be made relatively stiff without making the assembly difficult. As holes 93, etc. are preferably slightly smaller than bosses 85', 86' and 87' as seen in Figure 14 the parts are effectively held against undesired circumferential movement after assembly.

In the modified form of our invention illustrated in Figures 17 to 20 inclusive a link member S' is slidably attached to the bracket B" by guide loops 36' and 37'. Slidable between these loops 36' and 37' is the offset portion 94 of link S' which has a slot 95 therein similar to the previously described embodiment. On the opposite side of bracket B" from offset 94 of link S' is an offset portion 98 which has an outwardly extending circular flange 99 defining a central aperture therein. Spaced radially outwardly from flange 99 are three circumferentially spaced bayonet joint slots 100, each having deep and shallow portions similar to those previously described and as clearly seen in Figure 17. Lock projections 101 are formed on offset portion 98 of bracket B" and project inwardly immediately adjacent the deep portions of each of slots 100. As best seen in Figures 17 and 20 these projections 101 serve to resist detaching rotation of the tangs 102 on the flange portion 103 of push button support member 96 after assembly.

In installing push button support 96 and the bezel 97, which is carried thereby in the manner previously described, on bracket B" the tangs 102 are inserted into the deep portions of slots 100 and, upon rotation of the support member in attaching direction (clockwise in Figure 17), tangs 102 will move under the adjacent portions of offset 98, snapping over the projections 101 due to the dished cross-sectional contour of tangs 102 seen in Figure 20. This arrangement constitutes a modified form of bayonet joint means for detachably securing the push button unit to the main support bracket of our remote control apparatus.

In this form of our invention the push button guide sleeve 104 of support member 96 is disposed within the flange 99 on offset 98 of bracket B" and the push button 105 is slidably supported therewithin. Projecting inwardly from the closed end portion 106 of push button 105 within the tubular skirt portion 107 thereof is a generally conical abutment 108 having a transverse slot 109 (Figure 19) at its inner end. To limit outward movement of push button 105 in guide sleeve 104 a flange 110 is formed on the inner end of guide skirt 107 and functions in the same manner as flange 70 previously described. The link actuating member A' of this embodiment is also generally U-shaped and has a support portion 111 pivotally mounted at 112 on inwardly projecting flange 113 which is carried by the offset portion 98 of bracket B". The operating arm portion 114 of actuating member A' includes a spring holding tongue 115 which extends into slot 109 in the end of abutment 108 on push button 105 and effects operating connection between the push button and the link actuating member A'.

As in the previously described embodiment, the closed end or contact portion 116 of actuating member A' has a contact face 116' disposed to engage the end of slot 95 in link S'. Inward movement of push button 105 is permitted by a slot 117 formed in the skirt portion 107 thereof and aligned with the slot 109 in the abutment 108. In the same general manner as previously described, the actuating member A' lies partially within and is movable into the slot 117 when the push button is depressed from its non-operating or idle position shown in full lines in the drawings.

In order to avoid possible cocking and jamming of push button 105 in its guide sleeve 104 during outward movement a spring 118 is disposed in compression around the abutment 108 with its outer end engaging the closed end portion 106 of the push button and its inner end in engagement with a washer or the like 119 carried by the tongue 115 on actuating member A'. With this arrangement, when inward operating pressure is exerted on the outer end 106 of push button 105 the push button moves inwardly in the guide sleeve 104 and its movement is transmitted to the actuating member A' through the conical abutment 108. When the operating pressure is released the spring 15, acting through the lever 11 and link S', moves the actuating member A' toward idle position. However, as spring 118 is maintained under compression the returning force on the push button 105 is not exerted by tongue 115 at the outer end of conical abutment 108 but rather by the outer end of spring 118 at the inner surface of the closed end 106 of the push button. Spring 118 is relatively weak so that when the parts reach their idle positions of Figure 18 the end of tongue 115 is held in contact with abutment 108 by spring 15. As the application of outward pressure on push button 105 is thus disposed outwardly of the transverse center line of the outer sliding surface of the push button there will be no tendency for the button to tilt or cock sideways with possible jamming or locking in the sleeve 104. Thus, by providing spring 118, free action of the push button in its guide sleeve at all times is assured.

The end of link S' opposite to that shown in Figure 17 is slotted and is attached to the latch mechanism in the same manner as previously described in explaining the embodiment of Figures 1–12. The bracket B'' is also preferably positioned on the inner door panel 3 in the same manner in order to effect the desired spring loading of the entire mechanism by spring 15. It will be observed that the support portion 111 of link actuating member A' is disposed on the outside of the push button guide sleeve 104 and the operating portion 114 extends into sleeve 104 and the skirt portion 107 of push button 105. The contact face 116' of link actuating member A' engages the end of slot 95 in the offset portion 94 of link S'.

The operation of the apparatus of Figures 17 to 20 is substantially the same as that of the first described embodiment, i. e., inward pressure on push button 105 causes link actuating member A' to move about its pivotal support and the contact face 116' thereof to move in a direction generally parallel to the longitudinal direction of movement of link S', thus moving link S' from its full line idle position of Figure 18 into its phantom line latch releasing position. Release of operating pressure on push button 105 permits spring 15 to return the parts to their normal non-operating or idle positions, spring 118 acting to prevent jamming of the push button in its guide sleeve as described above. The push button unit of this assembly, including support member 96, bezel 97 and push button 105, may be installed or removed after the other parts are attached to the door structure, and the trim panel 7 is in position, by rotating bezel 97 so that the bayonet joint tangs 102 are engaged with or disengaged from the offset portion 98 of bracket B''. Thus, although the structural arrangement of the embodiment of Figures 17 to 20 differs somewhat from that of the first described embodiment, the advantageous features thereof are retained.

In Figures 21 to 25 another modification of our invention is illustrated in which a remote control link S'' is operatively associated with a bracket B''' which is adapted to be secured to the inner door panel by screws disposed in elongated holes 120 in the manner previously described. Secured to and forming a part of bracket B''' is an inwardly offset portion having side flanges 121 and 122 and a connecting web 123ª. Elongated slots 121' and 122' are located in parallel relation to each other in the side flanges 121 and 122 respectively and tangs 121'' and 122''' attach the offset portion to the main body of bracket B'''. In this embodiment the push button support and guide member 123 is formed in two parts, an inner base portion 124 and an outer guide sleeve portion 125. These may be crimped together as clearly seen in Figure 22 and the plastic bezel 126 is secured thereto as by tongues 127 extending through and anchored in suitable apertures in guide member 123 and inner base portion 124.

Spaced tangs 128, 129 and 130 project inwardly into the central aperture in base portion 124 of push button support 123 and are adapted to cooperate with circumferentially extending bayonet joint spring members 131, 132 and 133 formed on the bracket B''' around the outside of the central aperture 134 therein. As best seen in Figure 24, the free ends of the springs 131, 132 and 133 are bent upwardly so that when, during installation, tangs 128, 129 and 130 are placed in engagement with the bracket B''' adjacent these free ends and then rotated in attaching direction (counterclockwise as seen in Figure 21), they will slide under their respective springs forcing them outwardly until they reach their assembled positions seen in Figures 21 and 24 in which they are retained by the curved portions of the springs.

A pivot pin 135 is carried by and extends between side flanges 121 and 122 of bracket B''' and pivotally supports the outer end of support arm member 136. As seen in Figures 22 and 25, a slot 137 is formed in the inwardly offset portion 138 of link S'' which slot locates arm 136 on pivot pin 135 and permits longitudinal movement of link S'' thereover. At the end of offset portion 138 of link S'' an outwardly bent flange 139 is formed. This flange, and the adjacent portion of offset 138, are slotted as indicated at 140 to accommodate the outer end of a contact arm member 141 which is pivotally connected at its inner end, as by a pin 142, to the inner end of arm 136. Extending transversely and disposed in the corner between flange 139 and offset portion 138 of link S'' is a contact pin or rod 143 which extends across between side flanges 121 and 122 and through the slots 121' and 122' therein. The outer ends of pin 143 are headed over as seen in Figure 23 and it will be observed that pin 143 may move freely in and is guided by slots 121' and 122'.

The assembly of arms 136 and 141 is such that they constitute a toggle linkage. One end of this toggle has a fixed pivotal support on the bracket B''' while the other end can move longitudinally of bracket B''' and is guided by the pin 143 which also operatively connects arm 141 to link S'' by engagement with the bent end flange 139 thereon. As seen in Figure 22 the parts are in their idle or non-operating positions and are held there by spring 15 in the manner previously described. Inward pressure on the pivotal connection 142 between arms 136 and 141 will expand the toggle linkage and cause movement of link S'' from its idle position seen in full lines in Figure 22 into its latch releasing position shown in phantom lines. This inward movement of the pivot pin 142 is effected by a connecting or operating arm member 144 which is pivotally mounted on pin 142 between arms 136 and 141 as clearly seen in Figure 23.

Slidably supported in the push button guide sleeve 125 is a push button 145 having a tubular skirt portion 146 and a closed outer end portion 147. The slot 148 extends into the end portion 147 from its inner face in the same general manner as slot 72 of Figure 8 and the outer free end of arm 144 lies in slot 148 which is rounded at its bottom to conform to the rounded end of arm 144 (see Figure 22). It will be noted that the point of engagement between arm 144 and push button 145 is outwardly of the transverse center line of the outer cylindrical bearing portion of the push button body and thus undesired tilting and possible jamming of the push button in sleeve 125 during its return movement after operation is prevented. A flange 149 extending outwardly at the inner end of push button sleeve portion 146 limits movement of push button 145, and of the entire assembly, at the desired and proper idle position.

As in the previously described embodiments of our invention, the apparatus of Figures 21 to 25 lies partly on the inner side of the inner door panel 3 and partly on the outer side thereof. The toggle arrangement is such that the operator has the greatest mechanical advantage during the final part of the latch releasing movement of the push button, thus insuring that the pressure required to move the push button will not be undesirably increased after its initial inward movement. The elongated holes 120 in bracket B''' permit the installation thereof on door panel 3 to give the desired spring loading on all of the parts as has been fully described in explaining the embodiment of Figures 1–12. Furthermore, the push button support 123, bezel 126, and push button 145 may readily be installed or removed after the door trim panel has been attached.

Although we have described in considerable detail the three illustrated forms of our invention, it will be understood by those skilled in the art that variations and modifications may be made in the shape, arrangement and proportions of the parts which make up our improved remote control apparatus. We do not therefore wish to be limited to the specific constructions herein shown and described but claim as our invention all embodiments thereof covered by the appended claims.

We claim:

1. A remote control mechanism adapted to be associated with a door structure having spaced side panels and a latch mechanism including, a link, a bracket member adapted to be supported by one of said side panels, means on said bracket member for supporting one end of said link for limited longitudinal movement adjacent said one of said side panels, said link having a portion adjacent said one end offset toward the other of said side panels, link actuating means including a support portion, a contact portion and an operating portion disposed in generally triangular arrangement, means for pivotally supporting said support portion on said bracket member, said contact portion being disposed in said offset portion of said link and adapted to move in the general direction of said longitudinal movement of said link and operatively engage said offset portion of said link, said operating portion being spaced from said pivotal support means in the direction of said link movement whereby movement of said operating portion in a direction transversely of said longitudinal link movement will effect movement of said contact portion in the direction of said link movement, and manually operable means for exerting operating pressure on said operating portion, said manually operable means including a push button having a closed outer end portion and an inner skirt portion and means for supporting said push button for movement transversely of said plane of said door, said operating portion of said link actuating means extending into said push button inner skirt portion, and said support portion of said link actuating means being disposed outside of said push button inner skirt portion.

2. Remote control apparatus adapted to be associated with a door structure and its latch mechanism including, a link, means for supporting said link for longitudinal latch releasing and return movement in a plane generally parallel to the plane of the door with which the apparatus is associated, a bracket member, a link actuating member, means for pivotally supporting said link actuating member on said bracket member for movement in a plane extending transversely of the said plane of the door with which the apparatus is associated, said link actuating member having a contact portion adapted to engage and move said link and an operating portion angularly spaced from said contact portion about said pivotal support means whereby movement of said operating portion in one direction transversely of said plane of the door will effect longitudinal latch releasing movement of said link, manually operable means for moving said link actuating member in said one direction, and spring means disposed at the end of said link remote from said bracket member and effective at all times for urging said link, link actuating member and manually operable means in the opposite direction, said manually operable member including a push button having a closed outer end portion and an inner skirt portion and means for supporting said push button for movement transversely of said plane of said door, said operating portion of said link actuating member extending into said push button inner skirt portion, and said pivotal support means of said link actuating member being disposed outside of said push button inner skirt portion.

3. Remote control apparatus for a door having a latch mechanism and an apertured side panel including, a supporting bracket adapted to be secured to said side panel and span an aperture therein, a generally U-shaped link actuating member having a pair of arm portions, one of said arm portions having a pivotal support at its outer end on said bracket for movement in a plane transverse of the plane of said side panel, said pivotal support being outside of said side panel when the apparatus is installed in a door, the other of said arm portions extending outwardly through said aperture in said side panel when the apparatus is installed in a door, the base of said U-shaped actuating member being disposed on the inside of said side panel, a longitudinally movable link adapted to be supported for sliding movement generally parallel to said plane of the door side panel, said bracket having an aperture toward which said other arm portion of said link actuating member extends, manually operable means movable through said aperture in said bracket, and operative connections between said other arm portion and said manually operable means, said manually operable means including a push button having a closed outer end portion and an inner skirt portion and means for supporting said push button for movement transversely of said plane of said door, said other of said arm portions of said link actuating member extending into said push button inner skirt portion, and said one of said arm portions of said link actuating member being disposed outside of said push button inner skirt portion.

4. Remote control apparatus for a door having a latch mechanism and an apertured side panel including, a supporting bracket secured to said side panel and spanning an aperture therein, a generally U-shaped link actuating member having a pair of arm portions, one of said arm portions being pivotally supported at its outer end on said bracket outside of said side panel for movement in a plane transverse of the plane of said side panel, the other of said arm portions extending outwardly through said aperture in said side panel, the base portion of said U-shaped actuating member being disposed on the inside of said side panel, a longitudinally movable link supported for sliding movement generally parallel to said plane of the door side panel, said bracket having an aperture toward which said other arm portion of said link actuating member extends, a push button support member having a flange portion and a tubular push button guide portion, cooperating attachment means on said bracket and said flange portion for detachably securing said push button support to said bracket in alignment with said aperture therein, operating means for said link actuating member including a push button in said tubular guide portion adapted to swing said link actuating member about its pivotal support, operating connections between said base portion of said link actuating member and said longitudinally movable link, and means for operatively connecting said link to said latch mechanism.

5. In combination in a remote control apparatus for a door having a latch mechanism and an apertured inner side panel, a remote control link connected at one end to said latch mechanism and extending adjacent and generally parallel to said inner side panel, a bracket secured to said inner side panel on the outer face thereof, said bracket spanning said aperture in said side panel and having a portion offset outwardly from said inner side panel in alignment with said aperture in said inner side panel, spaced support means for said remote control link on said bracket whereby longitudinal sliding thereof is permitted, said link having a portion between said spaced support means offset in a direction opposite to said offset portion of said bracket, a link actuating member pivotally supported by said offset portion of said bracket for movement in a plane transverse of the plane of said inner door panel, said link actuating member being U-shaped and having a contact portion at the base thereof operatively engaging said offset portion of said link, an operating portion extending from said contact portion toward said offset portion of said bracket, and a supporting portion spaced from said operating portion and extending from said contact portion toward said offset portion of said bracket, and push button means mounted on said offset portion of said bracket and adapted upon depression to swing said link actuating member about it spivotal support with accompanying movement of said link in unlatching direction, said push button means having a closed outer end portion and an inner skirt portion, said operating portion of said link actuating member extending into said push button inner skirt portion and said supporting portion of said link actuating member being disposed outside of said push button skirt portion.

6. Remote control apparatus for an automotive vehicle door or the like having spaced side walls including, a link supported for longitudinal movement adjacent one of said side wall, a bracket member, an open ended tubular push button guide sleeve supported by said bracket member, a generally U-shaped link actuating member, said link actuating member having spaced arm portions extending transversely of said side walls in the same direction, one of said arm portions being disposed on the outside of said tubular guide sleeve and pivotally mounted on said bracket member and the other of said arm portions extending into said tubular guide sleeve, and push button means slidably supported in said guide sleeve and adapted operatively to engage said other arm portion.

7. Remote control apparatus for an automotive vehicle door or the like having spaced side walls including, a link supported for longitudinal movement adjacent one of said side walls, a bracket member, an open ended tubular push button guide sleeve supported by said bracket member, a generally U-shaped link actuating member, said link actuating member having spaced arm portions and a base portion, said arm portions extending transversely of said side walls in the same direction, one of said arm portions being disposed on the outside of said tubular guide sleeve and pivotally mounted on said bracket member and the other of said arm portions extending into said tubular guide sleeve, said base portion having operating connections with said link, and push button means slidably supported in said guide sleeve and adapted operatively to engage said other arm portion.

8. Remote control apparatus for an automotive vehicle door or the like having spaced side walls including, a link supported for longitudinal movement adjacent one of said side walls, a bracket member, an open ended tubular push button guide sleeve supported by said bracket member, a generally U-shaped link actuating member, said link actuating member having spaced arm portions, one of said arm portions being disposed on the outside of said tubular guide sleeve and pivotally mounted on said bracket member and the other of said arm portions extending into said tubular guide sleeve, and a push button slidably supported in said guide sleeve, said push button having a closed outer end portion and a tubular inner skirt portion, said tubular skirt portion being disposed within said guide sleeve and being longitudinally slotted to accommodate said link actuating member.

9. Remote control apparatus for an automotive vehicle door or the like having spaced side walls including, a link supported for longitudinal movement adjacent one of said side walls, a bracket member, an open ended tubular push button guide sleeve supported by said bracket member, a generally U-shaped link actuating member, said link actuating member having spaced arm portions, one of said arm portions being disposed on the outside of said tubular guide sleeve and pivotally mounted on said bracket member and the other of said arm portions extending into said tubular guide sleeve, and a push button slidably supported in said guide sleeve, said push button having a closed outer end portion and a tubular open ended inner guide skirt portion, said other arm portion of said link actuating member extending into said push button guide skirt and having engagement with the closed outer end portion thereof outwardly of the transverse center line of said push button.

10. Remote control apparatus for an automotive vehicle door or the like having spaced side walls including, a link supported for longitudinal movement adjacent one of said side walls, a bracket member, an open ended tubular push button guide sleeve supported by said bracket member, a generally U-shaped link actuating member, said link actuating member having spaced arm portions, one of said arm portions being disposed on the outside of said tubular guide sleeve and pivotally mounted on said bracket member and the other of said arm portions extending into said tubular guide sleeve, and a push button slidably supported in said guide sleeve, said push button having a closed outer end portion and a tubular open ended inner guide skirt portion, said other arm portion of said link actuating member including a pivoted extension extending into said push button guide skirt and having engagement with the closed outer end portion thereof outwardly of the transverse center line of said push button.

11. Remote control apparatus for an automotive vehicle door or the like having spaced side walls including, a link supported for longitudinal movement adjacent one of said side walls, a bracket member, an open ended tubular push button guide sleeve supported by said bracket member, a generally U-shaped link actuating member, said link actuating member having spaced arm portions, one of said arm portions being disposed on the outside of said tubular guide sleeve and pivotally mounted on said bracket member and the other of said arm portions extending into said tubular guide sleeve, a push button slidably supported in said guide sleeve, said push button having a closed outer end portion and a tubular open ended inner guide skirt portion, said other arm portion of said link actuating member extending into said push button guide skirt and having engagement with the closed outer end portion thereof outwardly of the transverse center line of said push button, and spring means effective on said link actuating member to urge said outer end portion of said push button outwardly.

12. In remote control apparatus for a door latch mechanism, a bracket adapted to be mounted on the door with which the apparatus is used, a link member carried by said bracket and movable relative thereto in latch releasing and return directions, push-button means operatively associated with said link member and carried by said bracket for movement in latch releasing and return directions, stop means on said bracket for limiting movement of said link member in said return direction, and means carried by said bracket for limiting movement of said push-button means in said return direction at a position where said link member will be held away from the position in which its return movement is stopped by said stop means.

13. In remote control apparatus for a door latch mechanism, a movable latch operating member, means for supporting said member on a door for movement in latch releasing and return directions, spring means for urging said member in said return direction, stop means for limiting movement of said movable member in said return direction, a link member operatively connected to said movable member, bracket means adapted to be mounted on the door with which the apparatus is used, push-button means carried by said bracket means for movement in latch releasing and return directions and having operating connection with said link member through an intervening actuating member, and means carried by said bracket means for limiting movement of said push-button means in said return direction at a position where said movable member will be held away from the position in which its return movement is stopped by said stop means and the operating connections between said movable member, link member and push-button means will be maintained in spring loaded condition by said spring means.

14. Remote control apparatus adapted to be associated with a door structure and its latch mechanism including, a link, bracket means for supporting said link for movement in latch releasing and return directions, stop means on said bracket means disposed to engage said link and limit movement thereof in said return direction, a link actuating member movably supported on said bracket means and adapted to have actuating engagement with said link, said link actuating member assuming a certain position relative to said bracket means when in actuating engagement with said link and said link is blocked by said stop means against further movement in return direction, manually operable means for moving said link actuating member, support means for detachably mounting said manually operable means on said bracket means for latch releasing and return movement between a non-operating position and a latch releasing position, and means for positively blocking said return movement of said manually operable means at said non-operating position, said manually operable means, when mounted on said bracket means and in said non-operating position, engaging and holding said link actuating member out of said certain position and said link actuating member holding said link away from said stop means on said bracket means.

15. Remote control apparatus adapted to be associated with a door structure and its latch mechanism including, a link, bracket means for supporting said link for movement in latch releasing and return directions, stop means on said bracket means for engaging said link and limiting movement thereof in said return direction, a link actuating member movably supported on said bracket means and adapted to have actuating engagement with said link, said link actuating member assuming a certain position relative to said bracket means when in actuating engagement with said link and said link is blocked by said stop means against further movement in return direction, manually operable means for moving said link actuating member, support means for detachably mounting said manually operable means on said bracket means for latch releasing and return movement between a non-operating position and a latch releasing position, means for limiting said return movement of said manually operable means at said non-operating position, said manually operable means, when mounted on said bracket means and in said non-operating position, engaging and holding said link actuating member out of said certain position and said link actuating member holding said link away from said stop means on said bracket means, and spring means effective on said link to move same in said return direction after latch releasing movement thereof.

16. Door control mechanism including a latch housing, a movable member mounted on said housing for latch releasing and return movement, means for limiting movement of said movable member in return direction, a remote control link, means for operatively connecting one end portion of said remote control link to said movable member, spring means for urging said movable member in said return direction toward said movement limiting means, a bracket member, means for adjustably mounting said bracket member on a door with which the mechanism is associated in spaced relation to said latch housing, said bracket member being adapted to support the opposite end portion of said link for latch releasing and return movement, stop means on said bracket member for limiting movement of said link in said return direction, a link actuating member supported on said bracket member in operating relation to said link, said actuating member having a certain position relative to said bracket member when said actuating member is in actuating engagement with said link and further movement of said link in said return direction is blocked by said stop means on said bracket member, manually operable means for moving said link actuating member, means for detachably mounting said manually operable means on said bracket member for movement between a non-operating position and a latch releasing position, said manually operable means, when mounted on said bracket member and in said non-operating position, being disposed to hold said link actuating member away from its said certain position, said link away from said stop means on said bracket member, and said movable member away from said movement limiting means, all against the action of said spring means.

17. Remote control apparatus for an automotive vehicle door or the like including, a bracket member, a link movably supported on said bracket member, an open ended push button guide sleeve supported on said bracket member, a link actuating member having spaced arm portions, one of said arm portions being pivotally mounted on said bracket member and the other of said arm portions overlying an open end of said push button guide sleeve, and a push button slidably supported in said guide sleeve, said push button having a tubular skirt portion slotted longitudinally from its inner end, said other arm portion of said link actuating member being aligned with the slot in said skirt portion whereby inward movement of said push button is permitted, and said push button having a head portion operatively engaging said other arm portion of said link actuating member.

18. Remote control apparatus for an automotive vehicle door or the like including, a bracket member, a link movably supported on said bracket member, an open ended push button guide sleeve supported on said bracket member, a link actuating member having spaced arm portion, one of said arm portions being pivotally mounted on said bracket member and the other of said arm portions overlying an open end of said push button guide sleeve, and a push button slidably supported in said guide sleeve and having a tubular skirt portion, a head portion, and an abutment extending inwardly from said head portion within said skirt portion, the inner end of said abutment portion being disposed inwardly of the transverse center line of said push button and operatively engaging said other arm portion of said link actuating member, and spring means disposed between said push button head portion and said other arm portion of said actuating member for urging said push button and said other arm portion apart.

19. Remote control apparatus for an automotive vehicle door or the like including, a bracket member, a link movably supported on said bracket member, an open ended push button guide sleeve supported on said bracket member, a link actuating member having spaced arm portions, one of said arm portions being pivotally mounted on said bracket member and the other of said arm portions overlying an open end of said push button guide sleeve, and a push button slidably supported in said guide sleeve, said push button having a tubular skirt portion slotted longitudinally from its inner end, said other arm portion of said link actuating member being aligned with the slot in said skirt portion whereby inward movement of said push button is permitted, and said push button having a head portion and an abutment extending from said head portion inwardly within said skirt portion, the inner end of said abutment portion being disposed inwardly of the transverse center line of said push button and operatively engaging said other arm portion of said link actuating member, and spring means disposed between said push button head portion and said other arm portion of said actuating member for urging said push button and said other arm portion apart.

20. Remote control apparatus adapted to be associated with a door structure and its latch mechanism including, a bracket member, a link supported by said bracket member for longitudinal latch releasing and return movement, link actuating means supported on said bracket member for movement in a plane transverse of the plane of a door with which the apparatus is associated, said link actuating means including a toggle linkage having one arm portion pivotally mounted at one end on said bracket member and another arm portion one end of which operatively engages said link, the other ends of said arms having a common pivotal connection to each other, and manually operable means for moving said common pivotal connection transversely of said plane of the door whereby said first named ends of said toggle arms are moved apart and said link is moved in latch releasing direction.

21. Apparatus as in claim 16 in which the link-actuating member takes the form of an articulated Y-shaped element.

22. Apparatus as in claim 16 in which the link-actuating member takes the form of an articulated U-shaped element.

23. Apparatus as in claim 16 in which the link-actuating member takes the form of a non-articulated U-shaped element.

24. Remote control apparatus adapted to be associated with a door structure and its latch mechanism including, a link, means for supporting said link for longitudinal latch releasing and return movement in a plane generally parallel to the plane of the door with which the apparatus is associated, a bracket, link actuating means pivotally supported on said bracket for movement in a plane extending transversely of said plane of the door with which the apparatus is associated, said link actuating means being U-shaped and having a contact portion at the base of the bight therein adapted to engage and move said link, said link actuating means having a first arm serving as an operating portion extending from said contact portion and having a second arm serving as a supporting portion extending from said contact portion and operatively connected to said bracket, and manually operable means carried by said bracket for moving said operating portion of said link actuating means in a direction transverse of said plane of the door, said manually operable means including a push button having a closed outer end portion and an inner skirt portion and means for supporting said push button for movement transversely of said plane of said door, said operating portion of said link actuating means extending into said push button inner skirt portion, and said supporting portion of said link actuating means being disposed outside of said push button inner skirt portion.

25. Remote control apparatus adapted to be associated with a door structure and its latch mechanism including, a link, means for supporting said link for longitudinal latch releasing and return movement in a plane generally parallel to the plane of the door with which the apparatus is associated, a bracket, link actuating means pivotally supported on said bracket for movement in a plane extending transversely of said plane of the door with which the apparatus is associated, said link actuating means being U-shaped and having a contact portion at the base of the bight therein adapted to engage and move said link, said link actuating means having a first arm serving as an operating portion extending from said contact portion and having a second arm serving as a supporting portion extending from said contact portion and operatively connected to said bracket, manually operable means detachably mounted on said bracket for moving said operating portion of said link actuating means in a direction transverse of said plane of the door, and spring means operatively associated with said link for urging said link, said link actuating means and said manually operable means toward their idle positions, said manually operable means including a push button having a closed outer end portion and an inner skirt portion and means for supporting said push button for movement transversely of said plane of said door, said operating portion of said link actuating means extending into said push button inner skirt portion, and said supporting portion of said link actuating means being disposed outside of said push button inner skirt portion.

26. Remote control apparatus adapted to be associated with a door structure and its latch mechanism including, a link, means for supporting said link for longitudinal latch releasing and return movement in a plane generally parallel to the plane of the door with which the apparatus is associated, a bracket, link actuating means pivotally supported on said bracket for movement in a plane extending transversely of said plane of the door with which the apparatus is associated, said link actuating means being U-shaped and having a contact portion at the base of the bight therein adapted to engage and move said link, said link actuating means having a first arm serving as an operating portion extending from said contact portion and having a second arm serving as a supporting portion extending from said contact portion and operatively connected to said bracket, manually operable means detachably mounted on said bracket for moving said operating portion of said link actuating means in a direction transverse of said plane of the door, spring means operatively associated with said link for urging said link, said link actuating means and said manually operable means toward their idle positions, and stop means effective on said manually operable means for limiting movement thereof toward said idle position while said spring means is maintained in loaded condition, said manually operable means including a push button having a closed outer end portion and an inner skirt portion and means for supporting said push button for movement transversely of said plane of said door, said operating portion of said link actuating means extending into said push button inner skirt portion, and said supporting portion of said link actuating means being disposed outside of said push button inner skirt portion.

References Cited in the file of this patent

UNITED STATES PATENTS

| | | |
|---|---|---|
| 224,040 | Prouty | Feb. 3, 1880 |
| 266,388 | Prouty | Oct. 24, 1882 |
| 1,558,980 | Halinka | Oct. 27, 1925 |
| 1,571,453 | Maxon | Feb. 2, 1926 |
| 1,705,706 | Bartholomew | Mar. 19, 1929 |
| 1,754,889 | Halinka | Apr. 15, 1930 |
| 1,800,619 | Galamb | Apr. 14, 1931 |
| 1,870,565 | Heintz et al. | Aug. 9, 1932 |
| 2,314,646 | Keats | Mar. 23, 1943 |
| 2,322,040 | Maruri | June 15, 1943 |
| 2,394,646 | Wagner | Feb. 12, 1946 |
| 2,460,607 | Sullivan | Feb. 1, 1949 |
| 2,476,332 | Tierney et al. | July 19, 1949 |